United States Patent
Lund et al.

(12) 
(10) Patent No.: US 7,168,603 B1
(45) Date of Patent: Jan. 30, 2007

(54) HYDROGEN POWERED FASTENER DRIVING TOOL WITH ONBOARD GENERATOR OF HYDROGEN

(76) Inventors: Bruce D. Lund, 551 N. Jackson, River Forest, IL (US) 60305; Michael D. Starrick, 811 N. Third Ave., Maywood, IL (US) 60153

( * ) Notice: Subject to any disclaimer, the term of this patent is extended or adjusted under 35 U.S.C. 154(b) by 0 days.

(21) Appl. No.: 11/425,059

(22) Filed: Jun. 19, 2006

Related U.S. Application Data

(63) Continuation-in-part of application No. 10/949,565, filed on Sep. 24, 2004, now Pat. No. 7,063,247, which is a continuation-in-part of application No. 10/392,415, filed on Mar. 19, 2003, now Pat. No. 6,796,387.

(51) Int. Cl.
*F02B 43/08* (2006.01)

(52) U.S. Cl. .................. 227/10; 227/129; 227/156; 60/275; 60/286; 123/3; 123/306; 173/104; 173/170; 173/171

(58) Field of Classification Search ............... 173/104, 173/114, 169, 170, 171; 227/10, 129, 156; 60/286, 275, 273, 284; 123/3, 25 B, 306
See application file for complete search history.

(56) References Cited

U.S. PATENT DOCUMENTS

| | | | | |
|---|---|---|---|---|
| 2,673,069 A * | 3/1954 | Carpenter | .................. | 175/93 |
| 4,051,909 A * | 10/1977 | Baum | .................. | 175/93 |
| 4,377,991 A * | 3/1983 | Liesse | .................. | 123/46 SC |
| 4,570,578 A * | 2/1986 | Peschka et al. | .................. | 123/1 A |
| 5,392,740 A * | 2/1995 | Teramoto et al. | .................. | 123/3 |
| 5,799,739 A * | 9/1998 | Takaada et al. | .................. | 173/217 |
| 5,842,623 A * | 12/1998 | Dippold | .................. | 227/10 |
| 6,484,491 B1 * | 11/2002 | Thordarson | .................. | 60/211 |
| 6,571,542 B1 * | 6/2003 | Fillman et al. | .................. | 56/10.6 |
| 6,796,387 B1 * | 9/2004 | Lund et al. | .................. | 173/104 |
| 7,063,247 B1 * | 6/2006 | Lund et al. | .................. | 227/10 |

* cited by examiner

*Primary Examiner*—Scott A. Smith

(57) ABSTRACT

A hydrogen operated fastener driving tool assembly including a hydrogen generator that is an integral part of the driving tool assembly. The hydrogen generator can use chemicals to generate hydrogen or electrolysis. Additionally, the generator may be disposable. Whatever is used it is capable of providing enough energy to drive over a thousand nails.

15 Claims, 5 Drawing Sheets

HYDROGEN POWERED FASTENER DRIVING TOOL WITH ONBOARD GENERATOR OF HYDROGEN

This application is a continuation-in-part application of Lund, et al. application entitled "Power Driven Equipment Utilizing Hydrogen from the Electrolysis of Water" filed on Sep. 24, 2004 having Ser. No. 10/949,565, now U.S. Pat. No. 7,063,247, which was a continuation-in-part of Lund, et al., application Ser. No. 10/392,415 filed on Mar. 19, 2003, now U.S. Pat. No. 6,796,387, also entitled "Power Driven Equipment Utilizing Hydrogen from the Electrolysis of Water."

The present invention relates to a fastener driving tool operated by hydrogen from a hydrogen generator that is part of the tool assembly. The hydrogen generator is located in an internal cavity of the tool and in one embodiment is chemical in nature using Sodium Borohydride. In other embodiments, a hydrogen generator can consist of an electrolysis unit, a disposable type using sodium borohydride to generate hydrogen gas or could employ a chemical generation system that uses a pressurized hydrochloric acid based solution and zinc granules to generate hydrogen gas.

To facilitate connection and disconnection between the hydrogen generator and the hose leading from the generator to the fuel chamber a novel quick connect device is employed.

Once activated the hydrogen generator creates sufficient hydrogen to drive a large number of fasteners.

The details of applicant's invention can be seen from the following drawings and the descriptions thereof in which:

FIG. 1 is a semi-cross sectional view of a hydrogen powered nail gun with an onboard hydrogen generator;

FIG. 2 illustrates an electrolysis unit used as a hydrogen generator;

FIG. 3 illustrates a disposable hydrogen generator using sodium borohydride to generate hydrogen gas;

FIG. 4 illustrates a chemical generation system that uses a pressurized hydrochloric acid based solution and zinc granules to generate hydrogen gas; and FIG. 5 illustrates a novel connect and disconnect assembly in the line exiting from a hydrogen generator leading to the fuel chamber of a hydrogen operated tool assembly.

Figure 1:
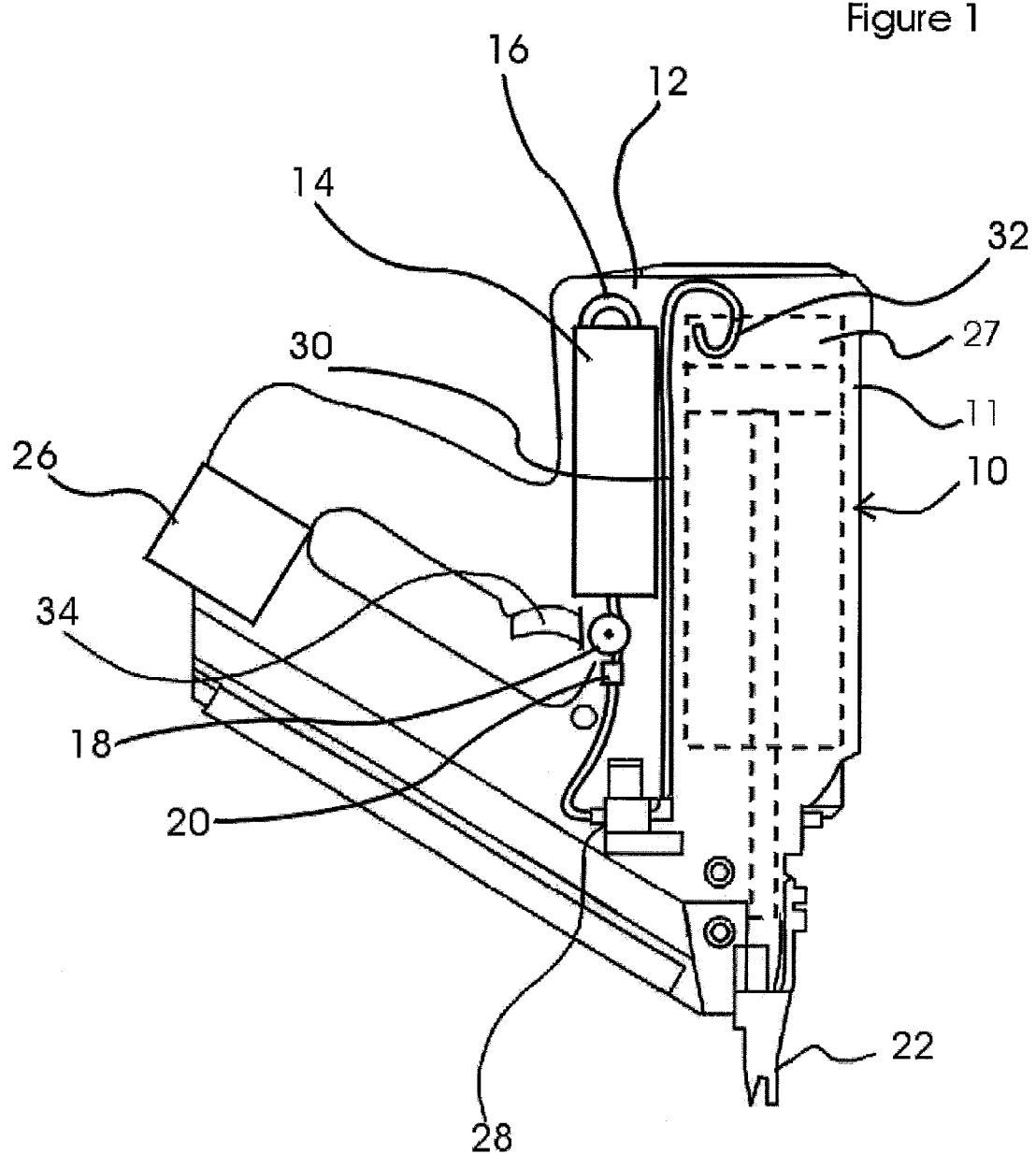
In FIG. 1, the hydrogen powered nail gun assembly 10 includes a housing 11 that defines an interior cavity 12 in which there is installed an onboard hydrogen generator 14. The particular generator shown schematically illustrates a hydrogen generator 14 that is chemical in nature using sodium borohydride, but other chemicals or configurations could be used and will be described in detail hereinafter. While hydrogen generation is not new the providing of a fastener driving tool that uses hydrogen fuel obtained by self-generated hydrogen as part of the tool assembly that can be operated for driving as many as 1,200 nails on a roof or the like in an essentially continuous operation is a substantial advance in the art. Internal combustion fastener driving tools have been around for some time and such tools generate a tremendous amount of heat and noxious fumes. They are thus, not capable of being utilized for long periods of time without substantial interruption.

The present novel invention comprises a self-contained hydrogen operated fastener driving tool assembly utilizing hydrogen generated onboard the assembly. During its operation, the generator once activated creates sufficient hydrogen to drive fasteners. The hydrogen is transferred out of the hydrogen generator 14 via a high pressure hose 16 to a pressure regulator 18. The pressure regulator 18 reduces the output pressure of the hydrogen to the rest of the system which allows for a ballast of hydrogen to be stored in the hydrogen generator 14 to power the hydrogen powered nail gun assembly 10 for repeated fastener applications. The hydrogen passes from the pressure regulator 18 through a check valve 20 that impedes any back pressure from the rest of the system affecting any components upstream.

In the illustrated embodiment, the hydrogen powered nail gun assembly 10 is operated by placing the safety tip 22 on the wood through which the fastener is to be driven. This is merely an example of one kind of safety device that can be used. In the illustrated embodiment, depressing the safety tip 22 activates a safety switch (not shown) and sends a signal to microprocessor 26. The microprocessor 26 sends a signal to gas solenoid 28 to allow the flow of hydrogen gas for a prescribed number of milliseconds which meters a given amount of hydrogen gas to enter fuel chamber 27 where it is ignited for driving a fastener. Although the flow of hydrogen gas has shown to be controlled electronically this could also be accomplished with a conventional mechanical metering system. Other types of safety systems for controlling the operation of the tool can obviously be employed.

The hydrogen gas flowing through the gas solenoid 28 is directed through delivery tube 30 to the combustion chamber 27. The configuration of the delivery tube can be simple with one outlet or circular with multiple outlets to better mix the hydrogen gas with the air. The hydrogen gas is delivered to the combustion chamber via swirl tube 32 to induce turbulence in the combustion chamber. With hydrogen gas mixed with ambient air the operator depresses a trigger which is shown as a piezo igniter 34 to operate the hydrogen powered nail gun. Although we have shown a piezo igniter 34 this system could also be operated with other systems such as an electronic ignition system.

In this configuration, the operating process cannot be repeated until the safety tip 22 is released, resetting a safety switch (not shown) and the combustion chamber 27 is opened to ambient air to refresh the air charge. A quick connect could be installed between the hydrogen generator 14 and the high pressure hose 16 and the novel details of one will be described hereinafter. Because of the unique characteristics of hydrogen combustion this nail gun can operate using the negative pressure to sweep out the spent gases. Also, because of the unique properties of hydrogen combustion the hydrogen readily mixes with the ambient air.

Figure 2:
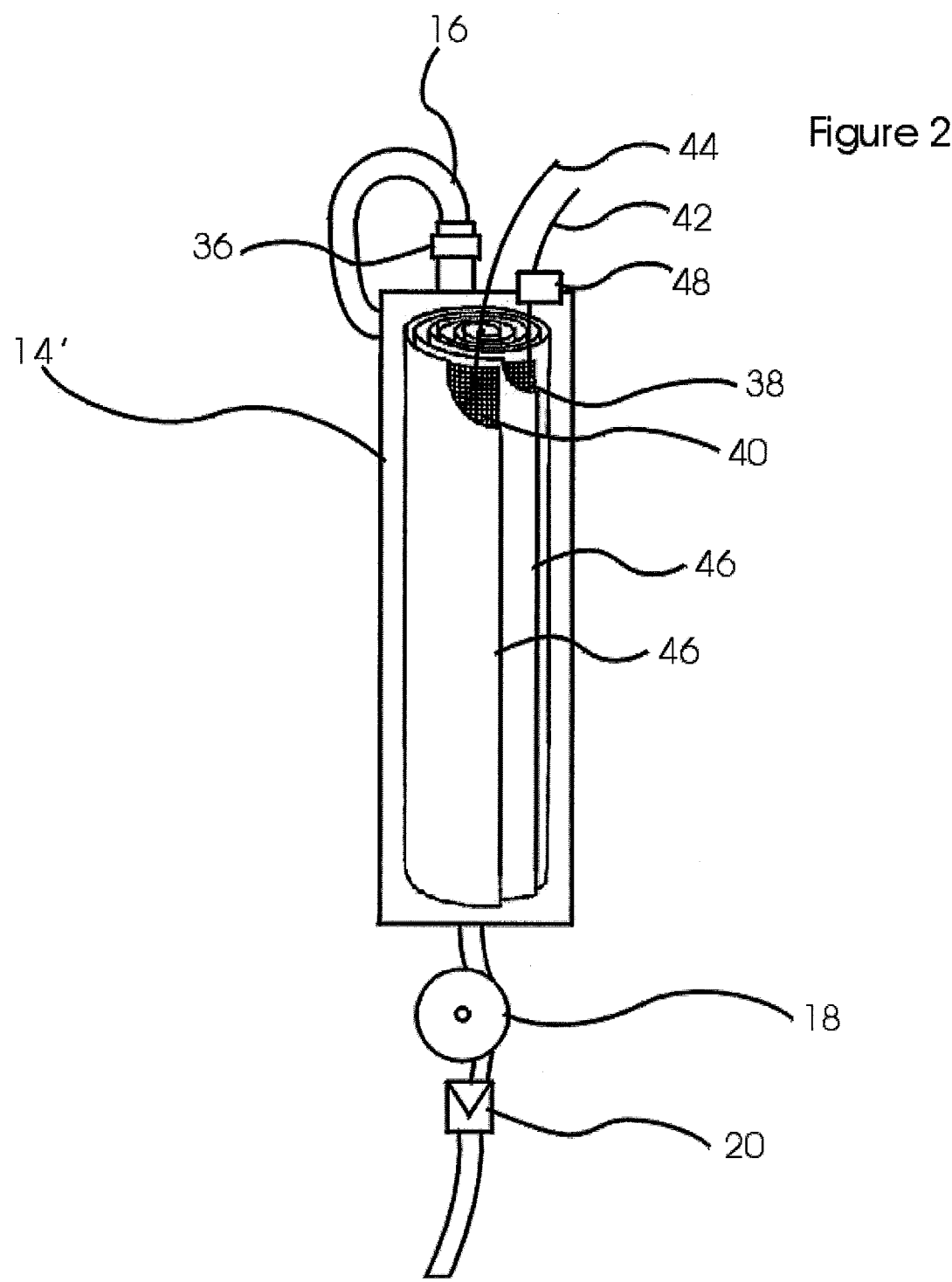

In FIG. 2 there is illustrated an onboard hydrogen generator 14' that employs an electrolysis unit. The hydrogen generator 14' is of sufficient size to deliver hydrogen gas as required at sufficient pressure and volume to allow for continuous operation of the hydrogen powered nail gun 10 with the ability to drive in excess of 1,000 nails with a single hydrogen generator. The hydrogen generator could be powered by a rechargeable battery (not shown).

The hydrogen generator 14' would be filled with an aqueous solution of water and an electrolyte to speed the production of hydrogen. The hydrogen gas would be liberated from the aqueous solution by allowing electricity to flow from a battery source (not shown) through anode wire 42 and cathode wire 44. The anode wire 42 and the cathode wire 44 are connected to the anode 38 and the cathode 40 positioned in the hydrogen generator 14'. The anode 38 and the cathode 40 are separated by a non conductive permeable separator 46 which allows the aqueous solution to come in contact with the anode 38 and the cathode 40. Mounted to the hydrogen generator 14' and connected to the anode wire 38 is pressure switch 48 that limits the pressure of the hydrogen gas output. The anode 38 and the cathode 40 could be arranged so as to capture both hydrogen as well as oxygen. Also, the oxygen could be vented out of the generator and only the hydrogen gas would be used. If desired a proton exchange membrane such as Nafion can be used.

Figure 3:
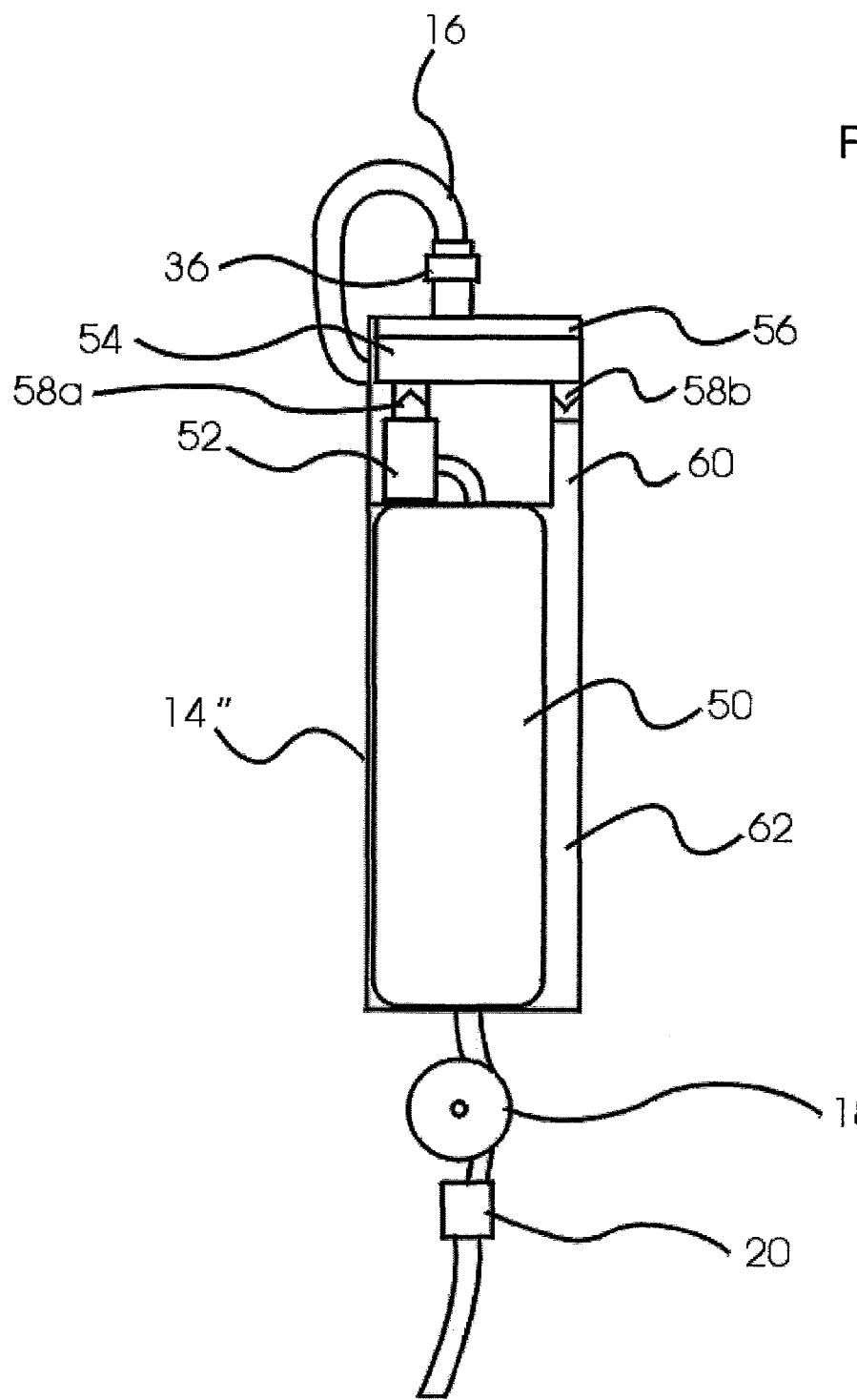

In FIG. 3 there is illustrated a disposable generator 14" using sodium borohydride to generate hydrogen gas. The hydrogen generator shown here would produce sufficient hydrogen gas to drive hundreds or over a thousand nails. The hydrogen generator 14" contains a flexible inner bag 50 which contains an aqueous solution of sodium borohydride. This solution could be premixed or user mixed as preferred by the user. When the operator connects the quick connect 36 (described in detail hereinafter) to the hydrogen powered nail gun assembly 10 of which it is a part, the resultant reduction of internal pressure in the hydrogen generator 14" allows a small portion of the aqueous solution to move from the inner bag 50 into the catalyst chamber 52. The aqueous solution reacts in the catalyst chamber liberating hydrogen gas and increasing the pressure in the hydrogen chamber 14". The liberated hydrogen gas moves past check valve 58a and into ballast chamber 54 then moves past check valve 58b and into equilibrium passage 60. As the pressure increases, the inner portion 62 of hydrogen generator 14" is pressurized and applies pressure to the outer surface of inner bag 50 which in turn moves more aqueous solution to the catalyst chamber 52. This process will continue until pressure equilibrium is achieved between the inner bag 50 and the inner portion 62 of hydrogen generator 14".

As the operator drives nails, the hydrogen gas moves from the ballast chamber 54 through hydrophobic membrane 56 and through quick connect 36. As the pressure in the ballast chamber decreases the pressure in inner bag 50 is decreased and the higher relative pressure in inner portion 62 moves more aqueous solution from the inner bag 50 to catalyst chamber 52. As the aqueous solution is exposed to the catalyst chamber 52 and hydrogen gas is liberated the resulting solution is of a different chemical composition. This solution is transferred to the inner portion 62 and is disposed of. This process of generation will continue until all of the sodium borohydride has been exposed to the catalyst chamber 52. Although we have illustrated and described a disposable system it could also be a refillable system.

Figure 4:
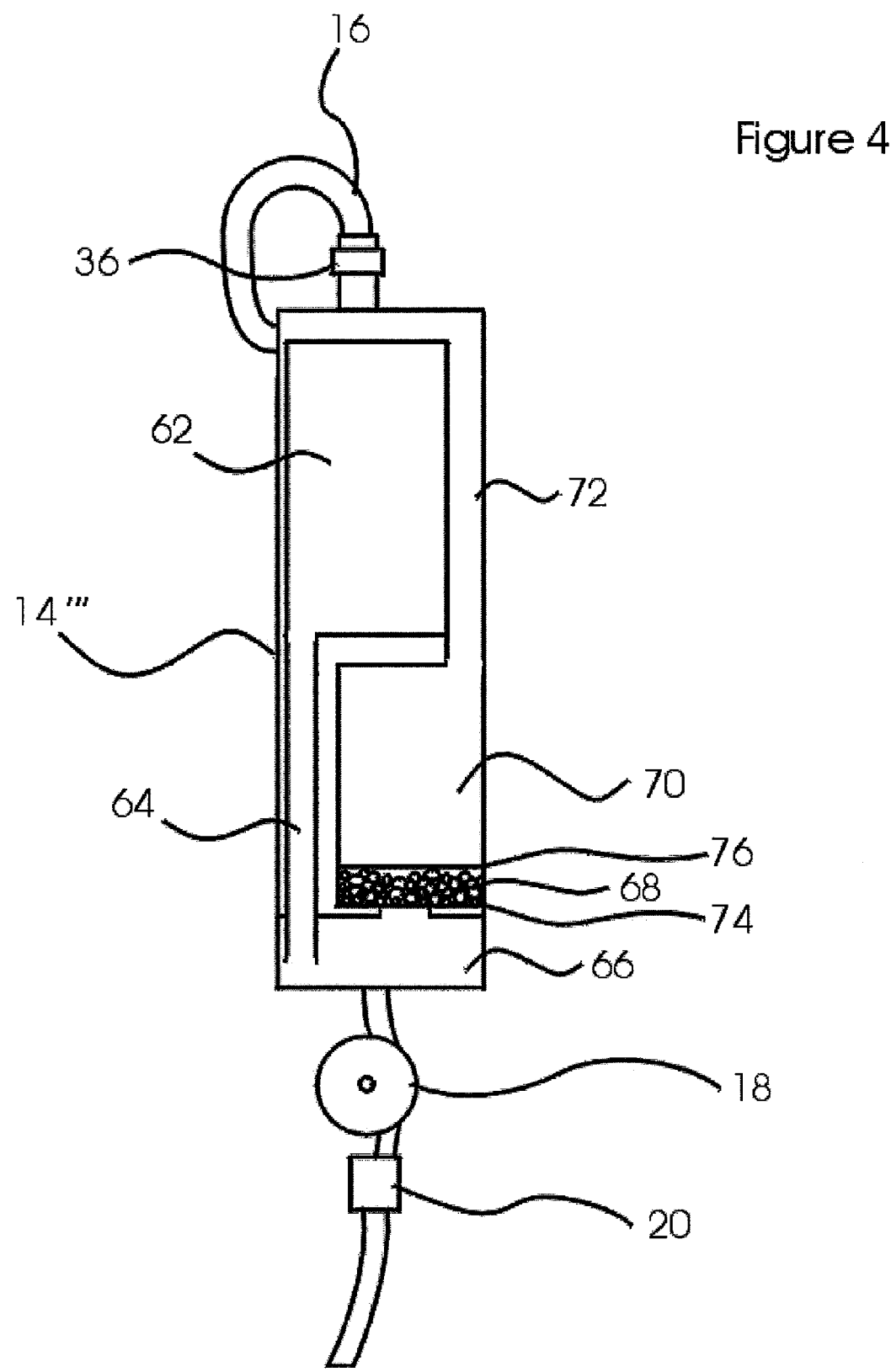

Now turning to FIG. 4, there is illustrated an onboard chemical generation system 14''', that uses a pressurized hydrochloric acid based solution and zinc granules 68 to generate hydrogen gas. In this configuration, the acid reservoir 62 is in communication with lower reservoir 66 via conduit 64. When the operator attaches quick connect 36 to the hydrogen powered nail gun 10 the pressure in the hydrogen generator 14''' is lowered and the hydrochloric acid is allowed to fill lower reservoir 66 and come in contact with zinc granules 68. The chemical reaction between the hydrochloric acid and the zinc granules liberate hydrogen gas. The zinc granules are separated by support screen 74 from the lower reservoir. The zinc granules are held in place by capture screen 76. This process continues until sufficient pressure is created to move the hydrochloric acid away from the zinc granules 68. When the operator uses the hydrogen gas the pressure in hydrogen chamber 70 is reduced and more hydrochloric acid is allowed to come in contact with the zinc granules 68. This process will continue until all the zinc granules have reacted with the hydrochloric acid. This reaction will produce sufficient hydrogen to drive hundreds to thousands of fasteners. The hydrogen gas moves from the hydrogen chamber 70 to the quick connect 36 via passage 72.

Figure 5:
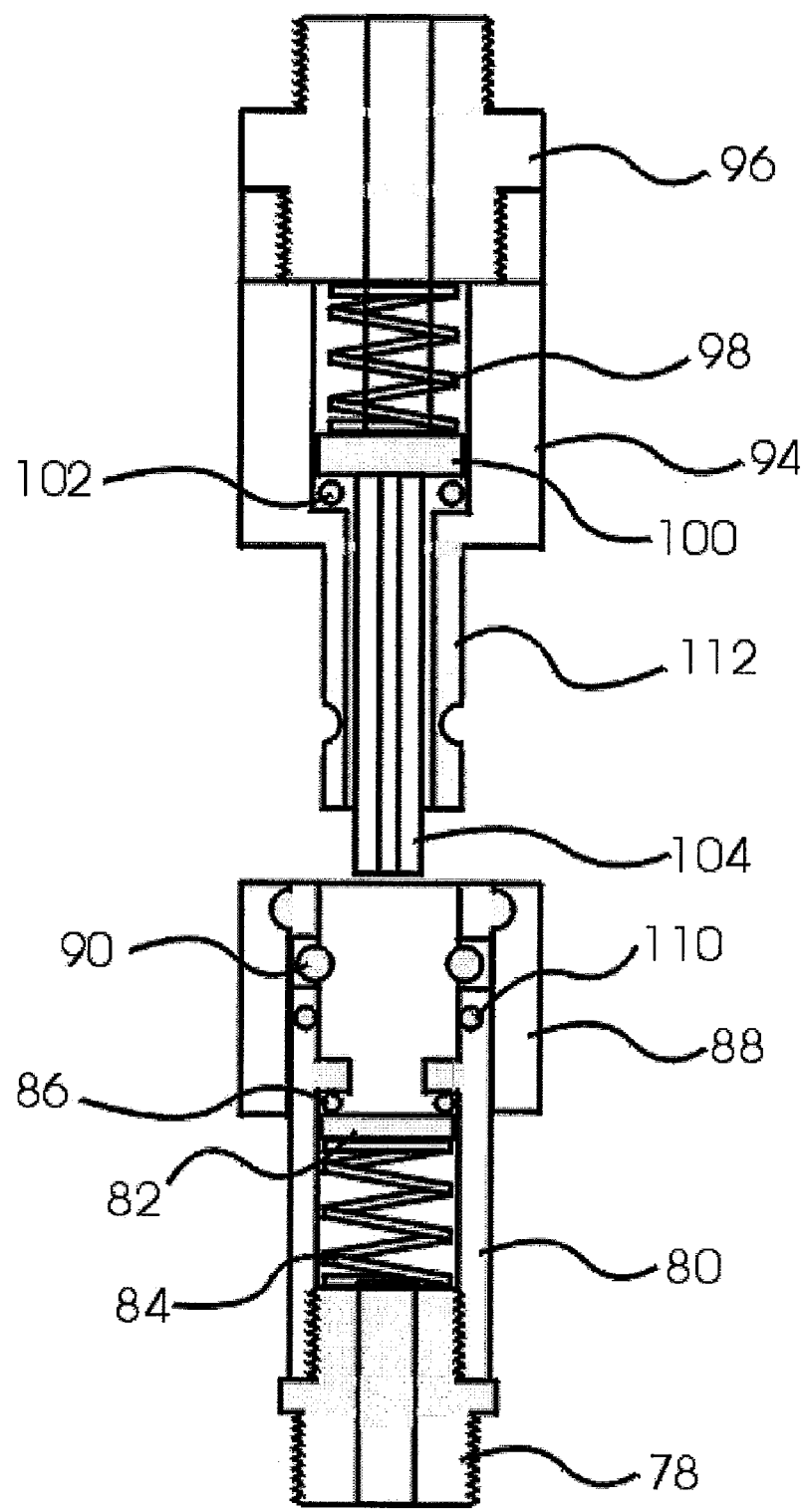

In FIG. 5, there is illustrated a detailed drawing of the quick connect 36. This enables the operator to quickly and efficiently disconnect or connect the onboard hydrogen generator to a conduit leading to the fuel chamber of the hydrogen operated fastener driving tool.

Hydrogen gas flows from the onboard hydrogen generator used into the inlet pipe fitting 78. The pipe fitting 78 holds a spring 84 and a seal plate 82 located in the housing 80 to which the inlet fitting 78 is connected. The housing 80 includes a seal 86 that seals off the flow of hydrogen through the quick connect 36 when the seal plate 82 is in contact therewith. A slide lock 88 works in conjunction with locking balls 90 to hold the quick connect fitting 36 together creating a gas tight seal with "0" ring 110. The quick connect 36 also includes an outlet pipe fitting 96 that holds a spring 98 as well as a plunger member 100 in the housing 94. Also in the housing 94 is a seal 102 against which plunger 100 is normally engaged when hydrogen is not to be supplied therethrough.

In operation the slide lock 88 is moved towards the pipe fitting 78 and locking balls 90 are allowed to move outwardly into an inner recess of slide lock 88. The fitting 94 of quick connector 36 can now be inserted into the housing 80. As the portion 104 of plunger 100 is inserted the tip 112 comes into radial contact with "0" ring 110' and seal plate 82 opening the port in fitting 78 to the passage of gas.

At the same time the seal plate 82 is moved away from seal 86 and the plunger 100 is moved away from seal 102 to allow for the passage of gas through the quick connect. While not illustrated the plunger 100 is limited in its movement to insure the clear flow of hydrogen gas through the quick connect 36.

To release the quick connect 36 the sleeve 88 is moved downwardly to allow the locking balls 90 to fit into the recesses.

It is intended to cover the appended claims all embodiments which fall within the true spirit and scope of the invention.

The invention claimed is:

1. A hydrogen powered fastener gun assembly comprising a housing, fastener supply means, a hydrogen generator mounted in said housing, the housing defining a fuel chamber, a driving piston in said chamber, means for controlling the flow of hydrogen through a gas flow line from said hydrogen generator to said fuel chamber and means for igniting the hydrogen in said chamber to move said piston to drive a fastener.

2. A fastener gun assembly as set forth in claim 1 in which the hydrogen generator is chemical in nature using sodium borohydride.

3. A fastener gun assembly as set forth in claim 2 in which the hydrogen generator is disposable, the generator includes a flexible collapsible bag containing sodium borohydride in an aqueous solution, an equilibrium passage, a catalyst chamber connected to the bag, a check valve, a ballast chamber and a hydrophobic membrane, and a quick connection means between the hydrogen generator and an outlet conduit leading to the fuel chamber whereby with the opening of the quick connection means the resultant reduction of internal pressure in the hydrogen generator allows a small portion of the aqueous solution to move from the flexible bag into the catalyst chamber where it reacts to liberate hydrogen gas and increase the pressure in the hydrogen generator, which liberated hydrogen gas moves past the check valve into the equilibrium passage and with the increase of pressure in the equilibrium passage the flexible bag is compressed to move more aqueous solution to the catalyst chamber to continue to provide hydrogen to the outlet conduit to drive fasteners until all of the sodium borohydride in used up whereupon a new flexible collapsible bag containing sodium borohydride will be substituted.

4. A fastener gun assembly as set forth in claim 1 in which the hydrogen generator is an electrolysis unit.

5. A fastener gun assembly as set forth in claim 4 in which the electrolysis unit contains an anode and cathode disposed in a solution of water and an electrolyte, means for supplying power to the anode and cathode, a non conductive permeable separator between the anode and cathode that allows the aqueous solution to come into contact with the anode and cathode and a pressure switch for limiting the pressure of the hydrogen gas output.

6. A fastener gun assembly as set forth in claim 1 in which the means for controlling the flow of hydrogen from said hydrogen generator to said chamber includes a pressure regulator for reducing the output pressure of the hydrogen to the chamber to allow for a ballast of hydrogen to be stored in the hydrogen generator for repeated fastener application.

7. A fastener gun assembly as set forth in claim 6 including a check valve for impeding any back pressure affecting any component of the assembly.

8. A fastener gun assembly as set forth in claim 1 in which the means for controlling the flow of hydrogen from said hydrogen generator to said chamber includes a microprocessor and a gas solenoid in the gas flow line operated by said microprocessor and means for controlling the microprocessor to operate the gas solenoid to meter the flow of hydrogen to said chamber.

9. A fastener gun assembly as set forth in claim 8 in which the assembly includes a safety tip which when depressed upon contact of the assembly with the material into which the fastener is to be driven signals said microprocessor to operate said gas solenoid.

10. A fastener assembly as set forth in claim 9 in which the gas flow line to said chamber is designed to induce turbulence in the hydrogen gas supplied to said chamber.

11. A fastener gun assembly as set forth in claim 1 in which the means for controlling the flow of hydrogen from said hydrogen generator to said chamber includes a mechanical metering means.

12. A fastener gun assembly as set forth in claim 1 in which the means for igniting the hydrogen in said chamber comprises a trigger activated piezo igniter.

13. A fastener gun assembly as set forth in claim 1 comprising a chemical generator system using a pressurized hydrochloric acid based solution and zinc granules to generate hydrogen gas, the generator includes an upper acid reservoir in communication with a lower reservoir containing zinc granules separated by a support screen in the lower reservoir, a hydrogen chamber for hydrogen when the acid and zinc granules react to form hydrogen and a quick connect assembly interconnecting the hydrogen chamber with the fuel chamber whereby when the quick connect assembly is opened pressure in the hydrogen generator is lowered and the hydrochloric acid is allowed to come in contact with the zinc granules whereupon hydrogen is generated and as the hydrogen from the hydrogen chamber is used more hydrochloric acid in allowed to come into contact with the zinc granules until all the granules have reacted with the hydrochloric acid.

14. A fastener gun assembly as set forth in claim 1 in which there is a quick connect device located between the hydrogen generator said gas line the device consists of interconnecting fittings each of which includes a spring biased sealing assembly, one of the fittings includes a depending member constructed and arranged to contact and unseal the sealing assembly in the other fitting when the fittings are engaged and in turn unseal the sealing assembly in said one fitting when the fittings are interconnected, and locking means for interlocking the two fillings to permit the flow of hydrogen therethrough.

15. A fastener gun assembly as set forth in claim 14 in which the locking means includes a slide member working in conjunction with locking balls.

* * * * *